Figure 1:
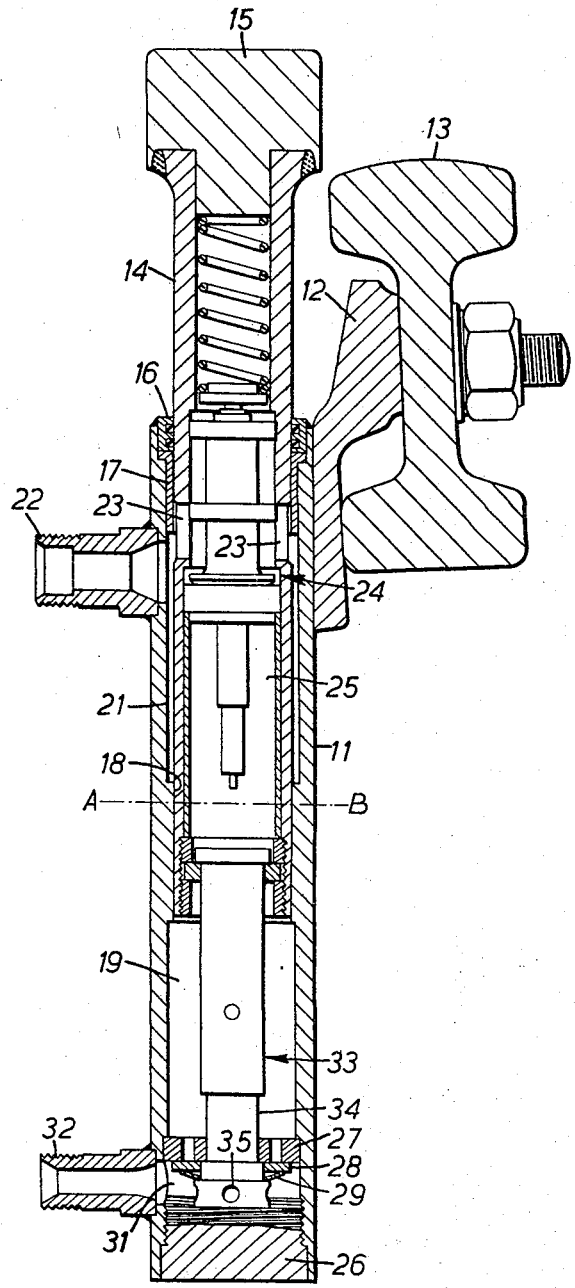

March 19, 1968

D. E. BICK ETAL  3,373,699
HYDRAULIC DEVICES FOR CONTROLLING THE
SPEED OF WHEELED VEHICLES

Filed July 25, 1966

3 Sheets-Sheet 1

INVENTORS
DAVID E. BICK
COLIN R. LITTLE
By Christensen, fanton +
matthews
ATTORNEYS March 19, 1968  D. E. BICK ETAL  3,373,699
HYDRAULIC DEVICES FOR CONTROLLING THE
SPEED OF WHEELED VEHICLES
Filed July 25, 1966  3 Sheets-Sheet 3
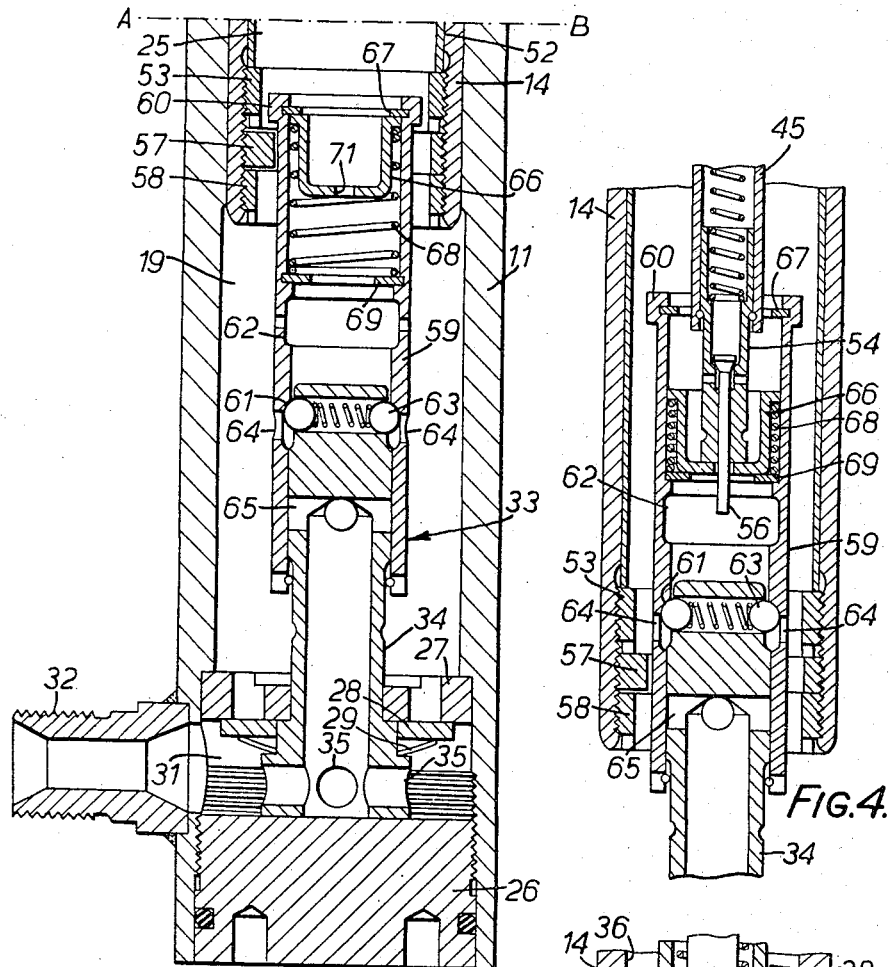
FIG. 3.
FIG. 4.
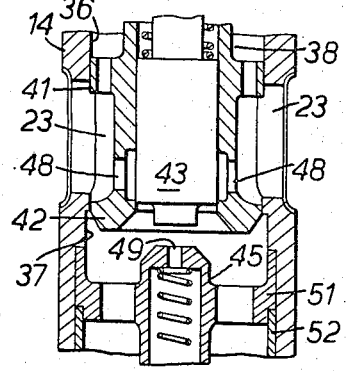
FIG. 5.

United States Patent Office 3,373,699
Patented Mar. 19, 1968

3,373,699
HYDRAULIC DEVICES FOR CONTROLLING
THE SPEED OF WHEELED VEHICLES
David E. Bick and Colin R. Little, Cheltenham, England, assignors to Dowty Mining Equipment Limited, Ashchurch, Tewkesbury, England, a British company
Filed July 25, 1966, Ser. No. 567,535
Claims priority, application Great Britain, July 30, 1965, 32,685/65
7 Claims. (Cl. 104—162)

This invention relates to telescopic hydraulic devices for use on a railway track to influence the speed of vehicles by acting against the peripheries of vehicle wheels. Devices in accordance with the present invention are intended, as are certain of the devices described in United States patent specification No. 3,040,676 to retard fast moving vehicles and to accelerate slowly moving vehicles.

In a known form of device, a cylinder member and a piston member together define a variable volume chamber which is connectable with an external source of low fluid pressure through a pressure-operated valve, and which is connectable with an external source of high fluid pressure through another valve which is mechanically operable by the movable one on said members, these valves being arranged to provide high fluid pressure resistance to contraction of the telescopic device for exerting a retarding force, and high fluid pressure action to extend the telescopic device for exerting an acceleration force.

In the known device, the high pressure valve was mechanically operated at the end of each stroke of the movable telescopic member, and its construction was complicated by the fact that after a contraction under low fluid pressure, the valve had to open for the ensuing extension, while after a contraction under high pressure, the valve had to close for the ensuing extension.

A further problem was that in certain circumstances, for instance with very slowly moving vehicles, the high pressure valve would open slowly so that a serious loss of fluid power could occur. The correct functioning of the high pressure valve could be further complicated by variations in the radial depths of wheel flanges which engage the devices.

A solution to the first mentioned problem, in accordance with the present invention consists in means for mechanical operation of the high pressure valve comprising a telescopic hydraulic tappet carried by the movable member of the device, this tappet having a lock valve which is closed by the pressure-operated valve at low fluid pressure whereby the hydraulic tappet is maintained extended by fluid pressure entrapped therein, and which is opened upon movement of the pressure-operated valve by fluid pressure in excess of the predetermined value whereby the hydraulic tappet is collapsible, the hydraulic tappet being operable during ultimate contraction movement of the piston and cylinder members when the lock valve is closed, to open the mechanically-operated valve whereby high fluid pressure is admitted to the chamber, but being collapsible during such contraction movement, when the lock valve is open, whereby the mechanically-operated valve is not opened.

According to a further feature of the invention, the mechanically-operated high pressure valve comprises co-operating valve elements having a spring detent for retaining the valve in its closed position, and wherein a spring device is arranged between the hydraulic tappet and the movable valve element, the spring device acting to move this element to the open position upon release of the spring detent by the force of the hydraulic tappet.

Figure 2:
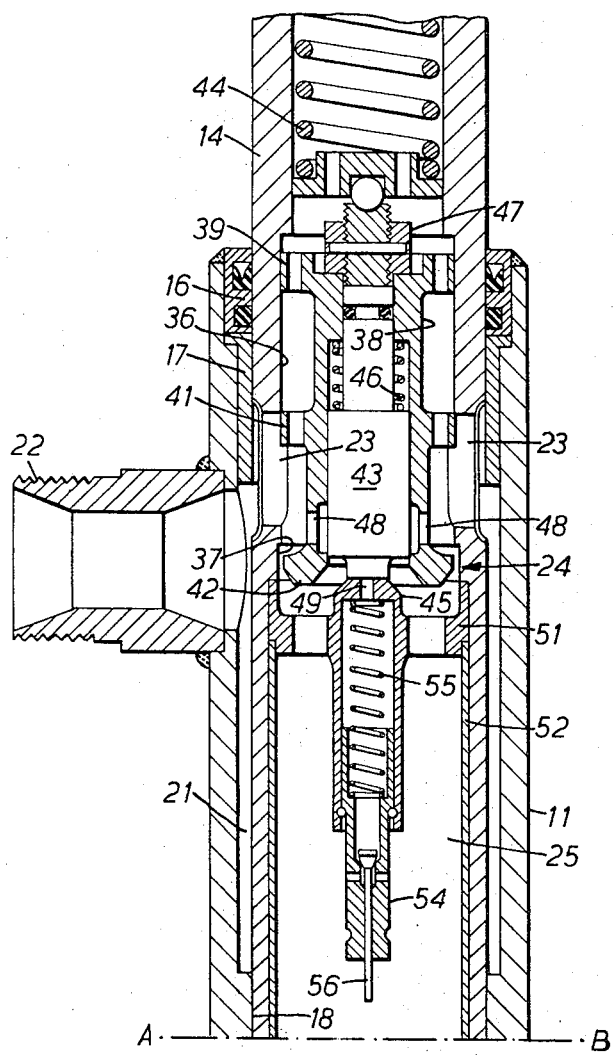

A telescopic hydraulic device in accordance with the invention is illustrated in the accompanying drawings, of which:

FIGURE 1 is a partial section on the central axis of the device,
FIGURE 2 is an enlarged sectional view above the line A–B of FIGURE 1, showing the valves carried by the piston member of the device,
FIGURE 3 is an enlarged sectional view below the line A–B of FIGURE 1, showing the valves carried by the cylinder member of the device,
FIGURE 4 is a detailed sectional view showing mechanical operation of one of the valves, and
FIGURE 5 is a detailed sectional view showing fluid pressure operation of another of the valves.

FIGURE 1 shows a cylinder member 11 mounted by a bracket 12 in an upright position against one side of a rail 13. A piston member 14 slidable in the cylinder 11 is provided with a head 15 which is engageable by the flange of a vehicle wheel rolling along the rail, whereby the head is first depressed to a position below the top of the rail and then rises to its former position. The piston member 14 enters a gland ring 16 and a bearing 17 in the upper end of the cylinder member 11 and it slidably engages a bore 18 in the cylinder member to seal a variable volume chamber 19 which is defined by the members 11 and 14.

An elongated annular recess 21 is formed in the cylinder 11 between the bore 18 and the bearing 17, while a connector 22 for a source of low fluid pressure opens through the cylinder wall into the recess 21. The piston member 14 has openings 23 to one side of a pressure-operated valve 24 which will be described with reference to FIGURE 2. The other side of this valve is open to the interior 25 of the low part of the piston 14 which is connected to, and forms the upper part of, the chamber 19.

The lower end of the cylinder 21 is closed by a plug 26. Above the plug, a disc-shaped non-return valve seat 27 is fixed in the cylinder, while an annular valve member 28 is urged upwardly by a spring 29. The space 31 between the plug 26 and the valve seat 27 is open to a connector 32 for a source of high fluid pressure. A mechanically-operated valve 33 has a hollow valve stem 34, the base of which is located centrally by the plug 26 and the valve seat 27, and is provided with radial openings 35 for high pressure fluid. This valve 33 will be described with reference to FIGURE 3.

The pressure-operated valve 24 in FIGURE 2 is formed in part by an upper bore 36 in the piston having the openings 23 therein, and a bore 37 which is of slightly larger diameter. An annular valve member 38 is provided with axially spaced flanges 39, 41, 42, the upper and middle flanges 39, 41 being slidable in the bore 36 to guide the valve member, and the flange 42 constituting a valve element which lies within the bore 37 when the valve is open and which lies within the bore 36 when the valve is closed.

The valve member 38 constitutes a relief valve body in which a piston-like relief valve member 43 is mounted. The member 43 is loaded by a spring 44 against a stop 45 which is fixed in the piston 14, while a second spring 46 urges the valve member 38 against an adjuster nut 47 on the screw-threaded upper end of the relief valve member 43. The nut 47 determines the normal position of the valve member 38 so that the gap between the lower flange 42 and the lower end of the bore 36 can be adjusted. The pressure-operated valve closes when the fluid pressure load acting over the area within the circumference of the flange 42 exceeds the load of the spring 44. The gap determines the flow required to produce a predetermined fluid pressure at which the valve will close. Relief valve openings 48 are formed in the valve member 38 between the flanges 41 and 42.

The stop 45 is provided by the outer cylinder of a telescopic strut, and it has a central orifice 49 which is normally closed by the lower end of the relief valve piston 43, such constituting a lock valve. The outer cylinder 45 is supported in the piston member 14 by a perforated flange 51, this flange 51 being located by a spacing tube 52 which is secured by a screwed ring 53, see FIGURE 3.

A plunger 54 is slidably mounted in the outer cylinder 45 and urged downwardly by a spring 55. The plunger 54 includes a vent valve having a movable element 56 which is formed with a stem projecting downwardly from the plunger 54. The cylinder 45 and the plunger 54 constitute a hydraulic tappet which is releasable either by the lock valve 43, 49 or by the vent valve element 56.

In FIGURE 3, a stop ring 57 is held in the lower end of the piston member 14 between the screwed ring 53 and a second screwed ring 58, this stop ring being notched to allow free passage for fluid across it. The stop ring 57 provides upward actuation of a sleeve valve 59 which is slidable on the hollow valve stem 34. The sleeve valve has an external flange 60 engageable by the stop ring 57. The sleeve valve has axially spaced internal recesses 61, 62 which are engaged by a spring-loaded ball detent 63 in the stem 34, for holding the sleeve valve 59 resiliently in its respective upper and lower positions. The recess 61 is formed with radial openings 64 which, in the lower position of the sleeve valve 59 register with a port 65 in the hollow stem 34 to provide communication between the chamber 19 and the high pressure source.

Mechanism for downward actuation of the sleeve valve 59 is provided by cup 66 which is loaded upwardly against an abutment ring 67 in the upper part of the sleeve valve 59 by a spring 68. The lower end of the spring 68 engages a second abutment ring 69 which forms a down limit for the cup 66. An aperture 71 is formed centrally in the cup to receive the vent valve element 56.

The operation of the telescopic hydraulic device will be described for the case of a slowly moving vehicle. Contraction movement of the piston 14 in the cylinder 11, caused by engagement of the head 15 by the flange of a vehicle wheel, produces a fluid pressure across the pressure-operated valve 24 which is less than the predetermined value. This valve therefore remains open, so that liquid is discharged from the chamber 19 to the low pressure source through the connector 22. The lock valve 43, 49 is closed so that the hydraulic tappet 45, 54 remains extended when it engages the cup 66 towards the end of the contraction stroke. The cup 66 compresses the spring 68 but the sleeve valve 59 does not move until the cup 66 engages the abutment ring 69, FIGURE 4. When the ball detent 63 is sprung out of the groove 61, the holding force is lost so that the spring 68 rapidly moves the sleeve valve to its lowest position in which the ball detent 63 engages the detent groove 62. Fluid from the high pressure source is then admitted to the chamber 19 through the port 65 and the radial openings 64. This high pressure immediately closes the pressure-operated valve 24 and opens the lock valve 43, 49. The hydraulic tappet 45, 54 can then collapse against the load of the spring 55 if the total travel available to the plunger 54 is taken up before the piston 14 reaches the end of its down stroke.

When the vehicle wheel allows the piston 14 to rise, this movement takes place under high pressure in the chamber 19 whereby an accelerating force is applied to the vehicle wheel. Towards the end of the upward stroke, the stop ring 57 engages the flange 60 and returns the sleeve valve 59 to its upper position at which high fluid pressure is cut off from the chamber 19.

The telescopic hydraulic device will thus accelerate a vehicle wheel travelling at speeds below a critical value, this critical value being that at which the predetermined pressure causes the pressure-operated valve 24 to close.

If then a vehicle is travelling at a speed above the critical value when the wheel flange starts to depress the piston 14, the pressure-operated valve 24 will close. Fluid is then discharged from the chamber 19 through the non-return valve 27, 28 to the high pressure source. If, however, there is excessive back pressure on the non-return valve, an additional discharge path is provided by the high pressure relief valve 43 to the low pressure source. Because the pressure-operated valve 24 is closed, FIGURE 5, the lock valve 43, 49 is open so that the hydraulic tappet 45, 54 can collapse on engaging the cup 66 without moving the sleeve valve 59. The fluid pressure resistance to contraction of the telescopic device applies a retarding force against the vehicle wheel. When the vehicle wheel allows the piston 14 to rise, pressure will fall in the chamber 19 so that the pressure-operated valve 24 will open under the fluid pressure of the low pressure source. Upward movement of the piston 14 then takes place under low fluid pressure without producing an appreciable speed-influencing force on the vehicle wheel.

The vent valve with its downwardly projecting element 56 is provided to safeguard the operating mechanism for the valve 33 in the event that there is a failure of the high pressure source during the depression of the piston 14 whereby the pressure-responsive valve 24 will open, or remain open. The lower end of the hydraulic tappet 45, 54 is capable of sufficient movement to operate the valve 33 in spite of variations in depth of wheel flanges and in the mounting of the device. If the lock valve 43, 49 remains closed because of the open condition of the pressure-responsive valve 24, the hydraulic tappet could, in certain circumstances due to such variations, engage the upper end of the valve stem 34 before the downward movement of the piston 14 is complete. To guard against damage in this event, the projecting end of the vent valve element 56 will enter the aperture 71 in the cup 66 and engage the valve stem 34, thus breaking the hydraulic lock and allowing the hydraulic tappet to collapse.

We claim as our invention:

1. A telescopic hydraulic device for use on a railway track to influence the speed of railway vehicles by acting against the peripheries of vehicle wheels, comprising a cylinder member and a piston member together defining a variable volume chamber, a pressure-operated valve carried by one of said members and interposed between said chamber and a connector for an external source of low fluid pressure, the pressure-operated valve including bias means acting to open the valve at low fluid pressures within the chamber but yielding to close the valve when the fluid pressure across the valve from the chamber exceeds a predetermined value, a mechanically-operated valve carried by the other of said members and interposed between said chamber and a connector for an external source of low fluid pressure, a telescopic hydraulic tappet carried by said one member and including a lock valve which is co-operable with the pressure-operated valve whereby the lock valve is closed when the pressure-operated valve is open, and whereby the lock valve is open when the pressure-operated valve is closed, the hydraulic tappet being operable during ultimate contraction movement of the piston and cylinder members, when the lock valve is closed so that the hydraulic tappet is maintained extended by fluid entrapped therein, to open the mechanically-operated valve, but being collapsible during such ultimate contraction movement, when the lock valve is open, whereby the mechanically-operated valve is not opened, supplementary valve means openable under high fluid pressure in the chamber to discharge fluid during contraction of the piston and cylinder members, and co-operable stop means formed on said one member and the mechanically-operated valve, said stop means being operable during ultimate extension movement of the piston and cylinder members to close the mechanically-operated valve if said valve was previously open.

2. A telescopic hydraulic device according to claim 1, wherein the mechanically-operated valve comprises relatively slidable valve elements, a spring detent operable between said valve elements to retain the valve in its closed position, and wherein a spring device is arranged between the hydraulic tappet and the moveable one of said valve elements, said spring device being compressed upon the approach of the hydraulic tappet towards the movable valve element and acting, upon release of the spring detent by the force of the hydraulic tappet, to move the movable valve element to the open position.

3. A telescopic hydraulic device according to claim 1, wherein the hydraulic tappet includes a vent valve having a release element which projects from the hydraulic tappet in the direction of the mechanically-operated valve, said release element being engageable with the mechanically-operated valve to open the vent valve upon completion of valve-opening movement by the hydraulic tappet, in the event that fluid pressure then admitted to the chamber is below said predetermined value and therefore unable to cause opening of the lock valve by the pressure-operated valve, whereby the hydraulic tappet is collapsible if the contraction movement of the telescopic hydraulic device has not by then terminated.

4. A telescopic hydraulic device according to claim 1, wherein the supplementary valve means includes a non-return valve openable to the high pressure source and a high pressure relief valve openable to the low pressure source.

5. A telescopic hydraulic device according to claim 4, wherein the high pressure relief valve comprises a spring-loaded member which is mounted in the movable member of the pressure-operated valve, and which is engageable with an opening in the hydraulic tappet under the load of the spring to constitute the lock valve.

6. A telescopic hydraulic device according to claim 5, including means for adjusting the position of the movable member of the pressure-operated valve with respect to the spring-loaded relief valve member, so as to determine the size of the opening of the pressure-operated valve.

7. A telescopic hydraulic device according to claim 1, wherein the pressure-operated valve is carried by the piston member and comprises a spring-loaded valve member having a flange which is radially spaced from a clearance bore formed in the piston member in the open position of the valve, and which engages a fitting bore formed in the piston member in the closed position of the valve.

References Cited
UNITED STATES PATENTS

| | | | |
|---|---|---|---|
| 3,040,676 | 6/1962 | Checkley et al. | 104—162 |
| 3,107,633 | 10/1963 | Bick et al. | 104—162 |
| 3,128,721 | 4/1964 | McGowan | 104—162 |
| 3,148,633 | 9/1964 | Bick et al. | 104—162 |

ARTHUR L. LA POINT, *Primary Examiner.*

D. F. WORTH, *Assistant Examiner.*